SYNCHRONIZING AND PHASING BROAD CROSS-SCAN TAPE RECORDINGS

Original Filed May 27, 1965 2 Sheets-Sheet 1

Inventor:
Thomas A. Banning, Jr.
Thos. A. Banning Jr

SYNCHRONIZING AND PHASING BROAD CROSS-SCAN TAPE RECORDINGS

Original Filed May 27, 1965

Inventor:
Thomas A. Banning Jr.
Thos. A. Banning Jr.

United States Patent Office 3,383,462
Patented May 14, 1968

3,383,462 SYNCHRONIZING AND PHASING BROAD CROSS-SCAN TAPE RECORDINGS

Thomas A. Banning, Jr., Apt. 1408, 5500–5520 S. Shore Drive, Chicago, Ill. 60637

Original application May 27, 1965, Ser. No. 459,399. Divided and this application Sept. 30, 1965, Ser. No. 491,749
19 Claims. (Cl. 178—6.6)

ABSTRACT OF THE DISCLOSURE

This case includes structures constituted to compare the rate of arrival of cross-scans previously recorded on the tape, and corresponding to lateral deflections of the kinescope beam, or the signals producing such lateral deflections. Any disparity between such rate of arrival, compared to the rate of lateral deflections, during a playing-back operation is corrected, either by slight adjustment of the one rate or the other rate. Phasing is produced by comparing the instants of production of synchronizing signals from the lateral deflection (or other unit), with the instants of sensing previously recorded synchronizing signals, on the tape. Phasing corrections are based on any disparity between such instants.

Figure 1:
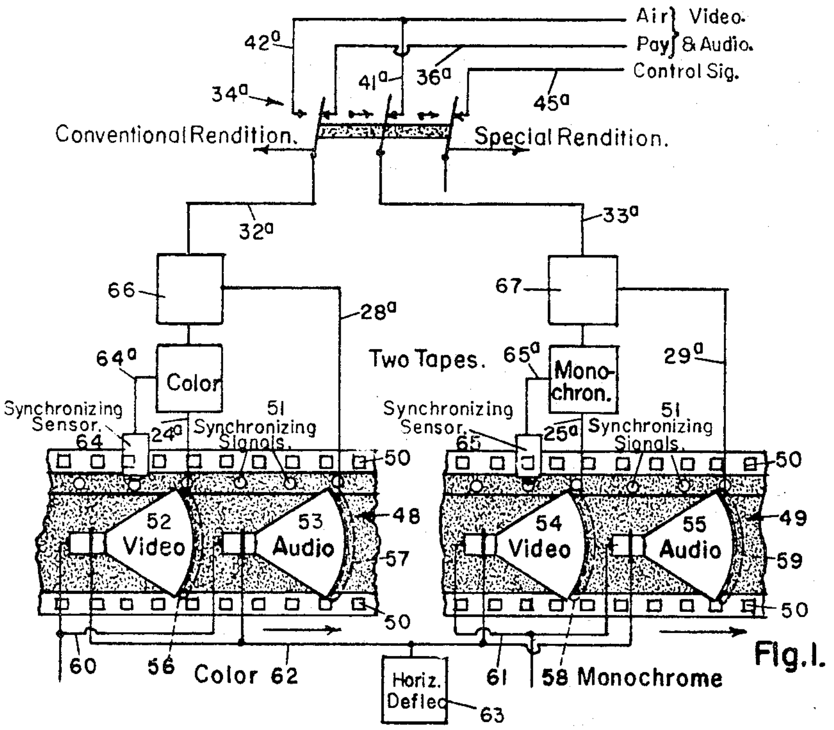

This invention relates to improvements in synchronizing and phasing broad band cross-scan tape recordings, and the like. This application is a division of my co-pending application for patent on improvements in subscription or pay-television, and the like, Ser. No. 459,399, filed May 27, 1965, and still pending.

The following statement will outline certain of the operational and other conditions which accompany cross-scan tape recordings, being recordings wherein the recorded signals are produced and must afterwards be sensed as signals carried by the travelling tape in the form of cross-wise extending scans produced on the tape close together, instead of comprising a linearly extending recording or recordings, wherein the signals are progressively recorded and afterwards scanned in such linear progress. Such cross-scannings are disclosed, by way of example, in my issued U.S. Patent, No. 2,976,354, filed May 4, 1954, and issued Mar. 21, 1961, and also in numerous other applications for U.S. patents, some of which have been issued. Under the cross-scanning operational recordings, it is evident that each cross-scan may carry many signal variations, dependent on the width of the cross-scanning area of the tape and the operation; so that, by producing the cross-scans close together as the tape progresses during scanning, the number of signal variations recorded per unit length of tape travel (e.g., per inch), may be greatly multiplied as compared to the number of signal variations which may be recorded and afterwards scanned, under the "lineal" scanning operations conventionally used at the present time. In fact, by producing the cross-scans as close together as for example two mils, and by using the tape of two inches cross-scanning width, it is possible to produce two times 500, times as many signal variations per inch of tape travel, as may be accommodated on a single linear scan recording along the tape length. For this reason, among others, the use of cross-scanning is imperative unless highly complex and expensive operational devices are provided, capable of recording numerous lineal lines of recording with corresponding sensing heads and electronic equipment and circuitry. The foregoing comparison between the conventional lineal recording and scanning arrangements, and the cross-scanning operations herein referred to, is especially applicable in the case of producing recordings of television programs, either monochrome or color, due to the high rate of signal variation, especially for the video signals. Such variations rate up to numerous megacycles per sec.

The production of the cross-scanned recordings may be produced, in the case of recordings of television programs, for example, as one cross-scan (or multiple thereof), corresponding to each lateral deflection of the electron beam of the kinescope of the television receiver. Under this operation each cross-scan so produced and recorded on the tape, will include variations of strength of the record at all points along the scan, corresponding to the variations of the strength of the electron beam of the kinescope (if the same program is being both televised and recorded at the same time). My earlier U.S. patent above identified includes means to produce such cross-scan recordings by use of a deflectable electron beam cross-scanning unit wherein each cross-scan of the recorder is produced under control such as to produce the recording effects outlined above. Other cross-scanning arrangements may also be used for production of the cross-scanning recordings, within the purview of the disclosures hereinafter to be revealed.

My earlier patent, above identified also includes provision for recording, on the tape in proper spacing relationship to the cross-scans so produced, recordings of the signals, such as bursts, identifying termination of each field of lateral deflections of the electron beam of the kinescope and commencement of the succeeding fields of such lateral deflections; so that, during later scanning and translating operations, for such operation as re-playing the televised program on the television receiver, the fields will be properly produced to ensure desired picture translations and rasters.

Under the foregoing and related operations, it is seen that there will be produced on the tape, cross-scanned records of the lateral deflections of the kinescope beam for each field of the televised picture program, such field of cross-scans being identified by the space between two such burst signals (hereinafter also defined as "synchronizing" signals), with the same number of cross-scanned records between such two brusts as there are lateral deflections for the corresponding field. Under present regulations of the F.C.C. there are 262 (or 263) such lateral deflections between each such pair of bursts. Under the same F.C.C. regulations there are produced two fields for each "frame" of the televised picture. Thus, such frame when cross-scan recorded will require 525 cross-scans of the recording, on the basis of assumed operations; and will require 525/500 inches of tape for the recording of each frame thus televised, being 1.05 inches of tape. Accordingly, when producing 30 frames per sec. which is a conventional operation, the tape speed will be 31.50 inches/sec. This is well within acceptable operational conditions. When the cross-scans are produced at closer spacing than 2 mils (e.g., at spacing of 1 mil), the tape speed may be proportionately reduced, namely, to 15.75 inches/sec.

Under present F.C.C. specifications, and conventional practise, the bursts defining termination of fields, and commencement of succeeding fields of horizontal deflections, may be used for production of the "synchronizing" signals already referred to, on the tape. The rate of production of such horizontal deflections is determined by the adjustment of the saw-tooth generator. Under conditions of perfect adjustment of the elements of circuitry, including such saw-tooth generator, there will be produced exactly 262 (or 263) horizontal deflections between each pair of bursts; but in case of lack of such perfection, there will be a number of horizontal deflections either greater or less than such correct number, between the incoming of two of the bursts. During the cross-scan recording of a given televised picture there will be produced on the tape a number of cross-scan recordings equal to the number of horizontal deflections produced by the saw-tooth generator of the receiver, between two of the received burst signals received from the sending station and translated by the receiver.

If during play-back of such a recording, the horizontal deflections of the beam of the deflectable beam sensor be actuated by the same saw-tooth generator as activates the deflections of the kinescope beam, so that the beams of both the receiver kinescope and of the recorder cross-scan sensor are in perfect step at all times, then perfect operation during such play-back must be based on compliance with two additional fundamental operational requirements. These are: first, that the rate of arrival of the previously recorded cross-scan records, at the location of the cross-scanning sensor of the recorder, shall at all times be equal to the rate at which the horizontal deflections of the kinescope beam and of the recorder sensor beam, are executed (such execution being, as previously stated, conveniently produced by the saw-tooth generator of the receiver); and, second, the sensing of the recorded cross-scans of the previously recorded field of deflections must begin simultaneously with the commencement of the horizontal deflections of the kinescope beam, which will produce translation of the recorded and sensed signals to produce a raster on the kinescope viewing screen, comprising a faithful translation of the intelligence recorded on the field of cross-scans so sensed and signalled to the receiver. These two requirements may be summed or re-stated thus:

The sensings of the successive previously recorded cross-scans comprising each previously recorded field, must exactly match and be produced simultaneously with, the production of the horizontal deflections and field of such deflections for each such field, which horizontal deflections of the kinescope beam may then be translated to produce on the viewing screen of the receiver, a raster which is a faithful replica of the recorded scans on the tape, comprising the corresponding field.

Still more precisely it may be summarized that, not only must the rate of the arrival of the recorded cross-scans of the tape, at the location of the cross-scan sensing element, be the same as the rate of production of the horizontal deflections of the kinescope beam, but also, the first or beginning recorded cross-scan of a field of cross-scans on the tape, must arrive at the cross-scan sensing element simultaneously with production of the first horizontal deflection of the kinescope beam, for production of a perfect raster on the viewing screen of the receiver, corresponding to such field of cross-scans recorded on the tape.

The need for establishing and maintaining the foregoing relationship of functions, and synchronisms as between the sensings from the tape recordings, and the operations of the deflectable beam of the kinescope, is true. Such need is emphasized when the productions of the horizontal deflections of the kinescope beam and of the deflectable beam of the recorder sensing element for sensing the cross-scan records, derive from a common source, such as the saw-tooth generator of the receiver, whereas the rate of arrival of the recorded cross-scans on the tape, at the location of the cross-scan sensing element, is determined by and is based upon the tape speed, the cross-scan recordings having been located on the tape at a previous recording operation, possibly produced by some other recording operation than electronically. When the tape drive is produced by a small power or fractional horse-power synchronous motor, while the sensings of the recorded signals for the cross-scans as well as for the synchronizing operations, are conveniently produced electronically or by use of electromagnetically controlled operations, it becomes evident that a control must be established between such two groups of elements and functions, to attain the objectives and perfections of operations which are commercially and scientifically demanded as outlined above. I shall disclose such control means and their operations hereinafter. Such control means is also constituted to produce practically instant response and correction of the rate of tape drive needed to produce correction and restore corrected operation of the signalling elements, even for very small disparities, such, for example, as minute variations in the frequency of delivered service type A.C., producing corresponding minute variations in the rate of tape travel, unless promptly corrected for. The control means hereinafter disclosed may be said to "lock" the tape speed produced by the motor but of varying motor speeds (within slight variations), to the horizontal deflections of the kinescope beam and their rate of production, to attain the necessary continuous synchronization of horizontal deflections of the kinescope and arrival of the successive recorded cross-scans at the sensing location. Also to "lock" the commencement of each field of recorded cross-scans to the commencement of the corresponding field of kinescope beam deflections to ensure production of the raster corresponding to such field of recorded cross-scans.

In my aforesaid patent, No. 2,976,354, I have included provision for the recording of each burst signal received from the sending station, on the tape alongside of the cross-scan recordings being produced; and I have also included in that patent, disclosures of sensing means constituted to sense and produce a "synchronizing" signal as each such record comes to such synchronizing signal sensing and signal producing unit. I have also, in such patent, shown various connections between such sensing unit and other elements disclosed in such patent. It is evident that if the number of kinescope beam deflections and the number of cross-scans signalled are not the same, either of two possible inaccurate conditions of translation may occur. These will be discussed; but first, it is evident that when re-playing the program from the cross-scans recordings, such recording equipment controls both the delivery of the cross-scans recorded signals to the kinescope beam, and the delivery of the synchronizing signals by which the kinescope beam is periodically re-set to its commencement or starting position (usually in the upper left-hand corner of the raster). The former (cross-scan sensed signals) determine the changing strength of the kinescope beam—the latter (synchronizing signals) determine the re-setting of the beam to its starting position. If during the interval between signalling two successive synchronizing signals the number of horizontal deflections of the beam exceeds the number of cross-scans sensed, each such horizontal deflection will occur in less time than is consumed in producing a full sensing scan. Accordingly, as each recorded scan is sensed, a corresponding beam deflection will execute a full deflection and part of the next one. Thus, the changing strengths of the beam will not occur at locations along the horizontal scans correct to correspond to the actual strength of the recorded signals of the scan recordings. Erroneous translation will thus occur in the raster produced by such incorrect operation. Such erroneous translation will be aggravated by the following condition:

Since, in the above assumed case, the number of horizontal deflections exceeds the number of cross-scans sensed, during the interval between arrival of two consecutive synchronizing signals, the raster thus produced will include more than the prescribed scans for a field (the number of recorded scans being assumed to be correct), it is evident that there will be a gradual but continuous inaccuracy of the beam strengths at successive locations along each scan thus inaccurately produced. The other inaccurate condition of translation may be as follows:

If the number of cross-scans produced during the interval between two successive synchronizing signals exceeds the number of horizontal deflections of the kinescope beam, each such beam deflection will include all of one scan recording, plus part of another. Thus there will again be produced a raster including less than the specified number of horizontal deflections; but more importantly, a raster which is completely unacceptable in proportion to the degree of such disparity between the numbers of beam deflections and the numbers of cross-scans sensed and signalled. Furthermore, in the present case the restoration of the kinescope beam to its starting position will generally occur before a full raster has been translated.

Since, in the foregoing studies, comparisons have been made between numbers of horizontal deflections and numbers of cross-scans sensed, during the interval between successive signalling of synchronizing signal records, it is seen that we may likewise effect such comparisons between rate of sensing recorded cross-scans, as compared to rate of production of the horizontal deflections of the kinescope beams. Since the number of such cross-scan recordings between such two successive synchronizing signal recordings is assumed to be substantially invariable, it becomes evident that rate of tape travel may be compared to the rate of horizontal deflections produced by the saw-tooth generator. On the assumption that exact equality is produced between the number of such recorded cross-scans between the two successive synchronizing signal recordings, and the number of deflections produced during the interval between such two synchronizing signal productions, the rate of tape travel is now correct. This assumption is then based on assumption that the saw-tooth generator has been calibrated or brought to its correct operational rate. Correct translation will now be produced. If, however, the rate of production of the horizontal deflections should change, an unbalance of conditions will occur, which must be corrected. Such correction may be produced either by correction of the saw-tooth generator operation (and probably, also, adjustment of the vertical deflection producing means); or such correction may be produced by change of speed of tape travel, as either an increase or a decrease is required.

The specific correction means herein disclosed is specifically constituted for correction of tape travel rate, by correction of rate of drive of the tape. Since the herein disclosed equipment thus effects comparison of the rate of arrival of the recorded cross-scans at the sensing element position, as compared to rate of horizontal deflections, I have for convenience sake designated the correction of such tape travel rate as a "synchronizing" correction means. It will be fully disclosed hereinafter.

Having corrected the rate of tape travel in direction (either increase or decrease) and amount, to cause the number of cross-scans arriving at the location of the scan sensing unit, to exact equality with the rate of production of the horizontal deflections of the beam, a condition of stability has been attained; but it is still possible, under some conditions and some operational structures, that incorrect "phasing" is occurring. By this I mean, that cross scan 3 of our earlier example, does not register with deflection 3′, but does register with another deflection, e.g., "$n+2'$." Under these conditions part of one field (e.g., the lower part) might be translated on the raster as being accompanied by part of either the preceding or the succeeding raster. Such a condition is herein referred to as being "out of phase." To produce correction it is then necessary to slightly advance or retard the tape speed for a short instant, with prompt restoration of such tape speed to its previously determined correct rate, for synchronization with the rate of the horizontal deflections. To effect such phasing correction I have also provided a unit which may be called a "phaser." It will be described in detail hereinafter.

In connection with the above phaser unit and its operation, it is noted that when the synchronizing signals are used for producing corrections of restoration of the starting position of the deflections of the beam, it may sometimes be unnecessary to produce any phasing correction. However, when other means are provided than such synchronizing signal to produce such restoration of the beam to its starting position, it will generally be necessary to make provision for the phasing corrections operation. In the embodiment hereinafter fully disclosed, both the synchronizing and phasing corrections are produced by a combined organization of simple form and high degree of accuracy of corrections.

The foregoing synchronizing and phasing operations may be well explained by the following further statement:

It is noted that the production of the cross-scans on the viewing screen of the kinescope, and the production of the corresponding cross-scan recordings on the tape, are both under control of the saw-tooth generator, or other elements of the kinescope, or elsewhere. Conventionally, the frequency of such cross-scan recordings is at the rate of 15,750 c.p.s., regardless of the speed of travel of the tape under its own drive. Accordingly, the spacings between successive cross-scans as recorded, will depend on the tape speed at the time of recording. Any slight variations of such tape speed during such recording will be reflected as slight variations between successive cross-scans. It is also now noted that during playing-back the rate at which the recorded cross-scans pass the sensing unit will depend on the tape speed during such playing-back, and that any slight variations of the tape speed will also be reflected as variations in the times of arrival of the cross-scans at the location of the sensing unit. It is also noted that during recording, the distance between successive synchronizing signal records on the tape will depend on the speed of the tape during the recording operation, including any slight variations of such speed during that recording operation.

When the previously recorded signals are to be correctly sensed and signalled back to a kinescope or program interpreting unit, it is evident that two conditions must be complied with; namely, a first condition being the speed of the tape during playing-back. That speed of the tape during playing-back must be so related to the rate of horizontal deflections produced in the kinescope, that the same number of recorded cross-scans on the tape are sensed as the number of horizontal deflections produced in the kinescope during a selected interval of time; that is, the rate of arrival of recorded cross-scans on the tape, at the location of the sensing unit must exactly equal the rate of horizontal deflections produced in the kinescope. Any departure from this equality can be corrected by control of either the tape speed or the rate of horizontal deflections in the kinescope, generally produced by adjustment of the horizontal-scan saw-tooth generator of the kinescope. The second condition above referred to is that the starting of the deflections for a field of the kinescope scans (being the shift of the kinescope beam to the starting position of the raster to be produced) must be coincident with the arrival of a recorded synchronizing signal carried by the tape, at the synchronizing signal sensing unit location. If such coincidence be absent, it is evident that although a full number of cross-scans will be sensed and produce signalling during production of a full number of horizontal deflections in the kinescope, still some (or many) of the cross-scans sensed and signalled to the kinescope will be out of phase with the kinescope deflections, so that the picture or interpretation produced on the viewing screen will comprise a portion of one field (e.g., the lower portion) and a portion of the proximate field (e.g., the upper portion). Such a condition must be corrected by ensuring proper phasing of the cross-scan records sensed, with the production of the horizontal deflections produced in the kinescope.

When the sensed synchronizing signal recordings are used to activate the saw-tooth generator circuitry (or other circuitry) to cause restoration of the beam to its starting position for production of the succeeding field, it is evident that each such kinescope field will be started when the first recorded scan of such field on the tape is being sensed, so that the successive scan records will be properly sensed and signalled to the beam intensity control element of the kinescope, provided that the speed of the tape, as compared to the rate of the horizontal deflections produced in the kinescope equals unity. When the restoration of the beam to its starting point is produced by signals other than originating at the synchronizing sensing unit of the recorder, it is evident that lack of exact phasing may and probably will occur from time to time, thus causing production of an imperfect picture. Accordingly, I have provided means to test the times of arrival of the sensed tape recorded synchronizing signals, against the times of arrival of the signals corresponding to start of deflections comprising a field of horizontal scans of the kinescope. When these two signals (defining respectively, start of a field of kinescope beam deflections, and start of a field of sensed cross-scans on the tape), arrive at substantially the same instant at the phase testing unit, no correction is made by advance or delay of the tape travel; when a difference exists in the times of arrival of such two signals at the phase testing unit, a correction is made or caused by such phase testing unit. Such correction will consist in a slight advance of the tape by a slight increase in tape speed superimposed on the otherwise corrected tape speed, or, conversely, a slight retardation of the tape speed superimposed on the otherwise corrected tape speed; but in each case such superimposed phasing correction of speed exists only long enough to bring the fields into phase, whereupon such correction stops, leaving the tape speed at that rate which had previously been produced for exact equality between the rates of arrival of the recorded cross-scans at the recorder sensor position, and of deflections of the beam of the kinescope. Thus both corrections have been produced and proper translation of the recorded signals will occur in the production of the kinescope raster.

Other objects and uses of the invention will appear from a detailed description of the same, which consists in the features of construction and combinations of parts, hereinafter described and claimed.

Figure 3:
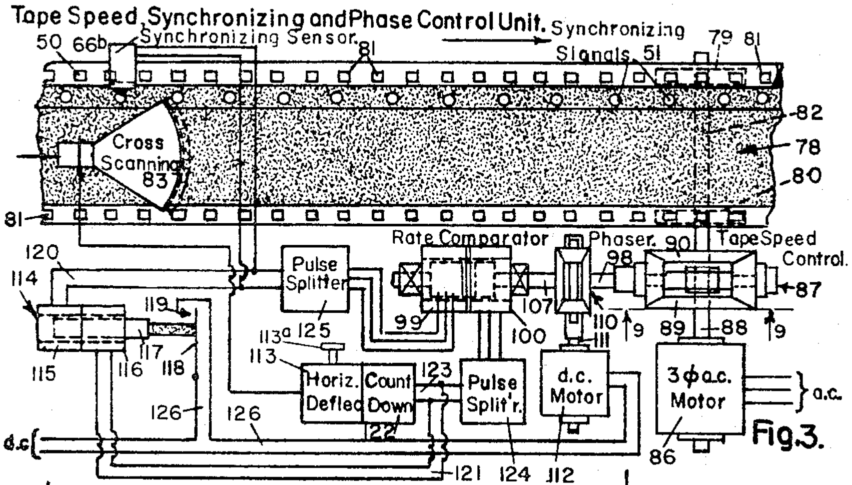
Figure 2:
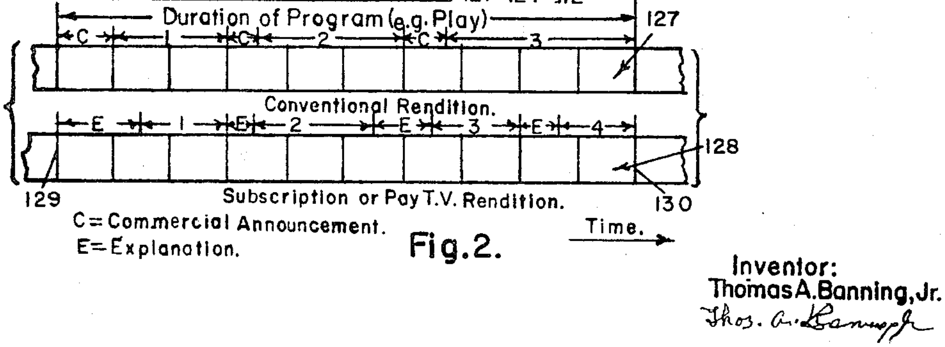
Figures 9, 10:
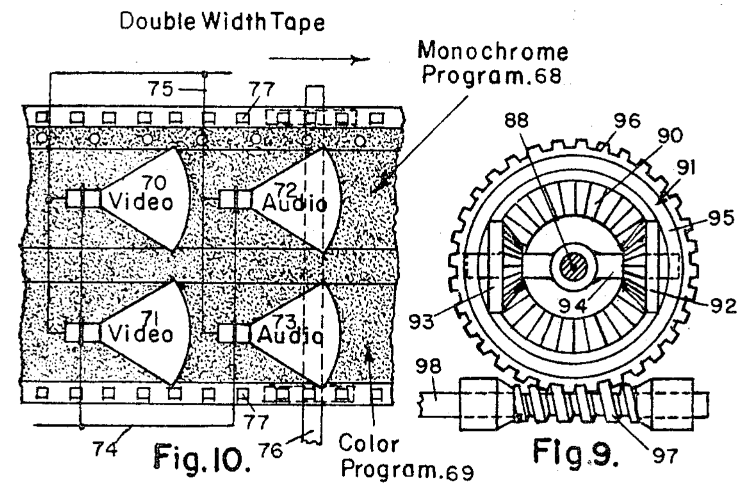
Figure 8:
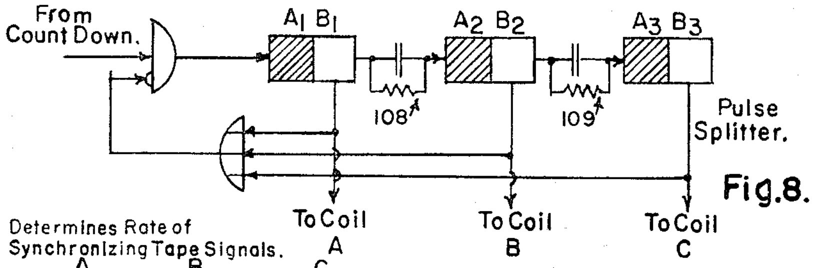
Figures 4, 5, 6, 7:
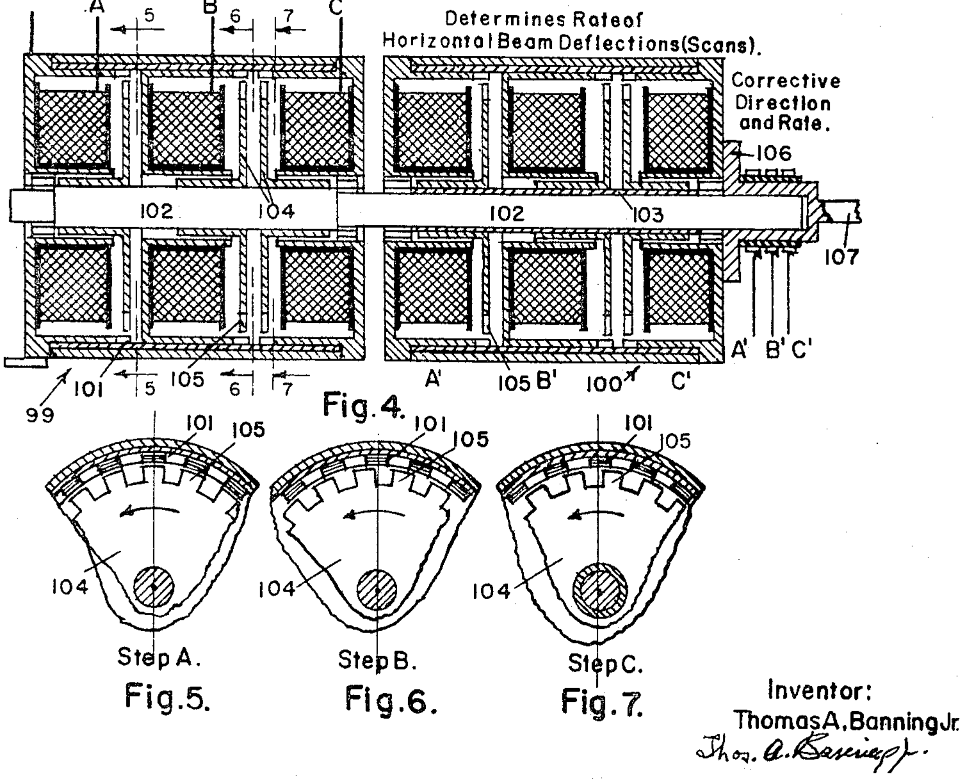

In the drawings:

FIGURE 1 shows, schematically, portions of two tape recordings carrying cross-scanned signals, wherein one set of video signals is recorded on each tape recording, and another set of audio signals is superimposed recorded on each of such tape recordings; with a sensing unit for video signals, and a sensing unit for audio signals, in place with respect to each such tape recording, for sensing the corresponding cross-scan records (either video or audio); and with provision for transmitting the so sensed video and audio signals, corresponding, by way of example to two different aesthetic renditions of a given program, in such manner as to enable reception of such two renditions according to the operational conditions set forth in my said application, Ser. No. 459,399; the disclosures of such parent application including drive of both such tape recordings at exactly the same speed, the showing of the two tapes in FIGURE 1, in tandem instead of side by side being a matter of convenience of placement on the drawing sheet; and this figure also shows, schematically, the switching means provided in connection with such two tape recordings, for production of the operational conditions fully disclosed in such parent application;

FIGURE 2 shows, schematically, a section of a time comparison of the renditions of the recordings of the two recordings carried by the two tape elements of FIGURE 1, according to the disclosures of my said parent application;

FIGURE 3 shows, schematically, a section of tape carrying cross-scan recordings (not shown as they are invisible), and a sensing unit in place with respect to such tape, to sense and deliver signals according to the sensing of the cross-scan records, being a sensing unit which may, by way of example, correspond to the disclosures of my earlier patent, No. 2,976,354; such figure also showing synchronizing signal records proximate to the recorded cross-scans, and a synchronizing signal record sensing element in place with respect to the tape; also, by way of example, corresponding to disclosures of my earlier patent, above identified; and this figure shows, schematically, means to compare the rates of arrival of cross-scan recordings at the location of the sensing unit, with the rates of horizontal deflections being produced in, for example, a television receiver kinescope, and for producing corrections to reduce any disparity between such compared rates, and to bring the compared rates to equality; and this figure also shows, phasing means constituted to produce phasing corrections to cause the successive cross-scans sensed by the sensing unit, to arrive at the location of the sensing unit concurrently with production of the horizontal deflections to which they correspond, in the television receiver;

FIGURE 4 shows one embodiment of a rate comparator for comparing the rates of execution of horizontal deflections of the kinescope beam and of the passage of recorded scans through the sensing zone of the recorder, for purposes of determining the direction and rate of disparity between such two rates, if any, and for translating such disparity into rotations which may be delivered to other elements of the tape controlling unit; the comparator illustrated comprising two identical stepping motors acting together to compare rates of pulses delivered to their stators, and delivering to an output shaft rotations in direction depending on which of the compared rates predominates, and at rate equal to the difference between the two compared rates;

FIGURES 5, 6 and 7 are cross-sections through the showing of FIGURE 4, being taken on the lines 5—5, 6—6 and 7—7 of FIGURE 4, looking in the direction of the arrows; and these three figures show the relative tooth positions of the rotor section of one of the motors, at completion of a pulse delivered to the motor stator A, to bring the rotor and stator teeth of such rotor and stator into registry, with simultaneous shift of the rotor teeth of the other two motor sections B and C, to positions with respect to the stators of such sections B and C as shown in the figure;

FIGURE 8 shows, schematically, a simple form of element constituted to receive a pulse and translate the same into three successive and equally timed spaced pulses; such unit being used for delivery of the sets of three pulses each, to the stator sections of each of the stepping motors shown in FIGURES 4, 5, 6 and 7;

FIGURE 9 shows an irregular section taken on the line 9—9 of FIGURE 3; and FIGURE 9 shows schematically, the form of a differential transmission unit for transferring driving shaft rotations to a driven shaft, with provision for changing the phase between such driving and driven shafts by rotation of the differential cage element of the differential unit, rotation of such cage through a given angle serving to advance or retard the driven shaft by double the angle of such cage rotation; and by driving such cage in the one direction or the other, the driven shaft will have its speed either increased or decreased during the interval of such cage rotation, by an amount double the rate of the cage rotation during such correction; and FIGURE 10 shows a section of tape of width sufficient to accommodate two sets of cross-scan recordings; and this figure also shows schematically, a video signal sensing element for each set of the cross-scans, and an audio signal sensing element for each of the sets of cross-scans; and this figure also shows the synchronizing signal recordings along one edge portion of the tape.

In FIGURE 1 I have, by way of illustration, shown one embodiment of a tape recorder and play-back installation, with which the features of my present invention may be used. The tape recorder embodiment thus shown in FIGURE 1 is also shown in my aforesaid parent application, Ser. No. 459,399. It includes provision for sensing and translating a pre-recorded program of which the recordings have been made for translation into signals for the video components of the program under both monochrome and color signal translations, simultaneously. In the particular embodiment shown in FIGURE 1 of this case, two tape sections 48 and 49 are shown in alignment with each other, but, as explained in that parent case, such two companion tape sections may also be located alongside of each other; or, if desired, they may both comprise a double width tape whereon such two sets of recordings are jointly carried. All such alternative embodiments are shown in such parent case, and are contemplated as being within the disclosures to be herein described, as respects the tape controls, for both synchronizing and phasing operations.

The showing of present FIGURE 1 also includes schematic showings of connections from the tape recordings to outlet terminals by which the operations disclosed in that parent case, for various subscription or pre-pay television operations, may be produced and controlled. Such schematic showings of FIGURE 1 include master switching means which is used in controlling the deliveries of the video and audio signals for such subscription or pre-pay television operations. FIGURE 1 also includes the showing of sensors for both video and audio signals which have been cross-scan recorded on the tape sections; all such showings being by way of examples of specific uses of tape recordings and tape sensing operations, wherein the controls herein to be disclosed may be embodied. Also, the showings of the present application include the sensing of recorded "synchronizing" signals designating termination of each field of cross-scans recordings, and commencement of the next field of such recordings, together with interconnections between such synchronizing unit elements (hereinafter specifically disclosed), and the deflection producing and synchronizing signal means of a television receiver; whereby various of the operations already referred to herein, may be produced.

Interconnections between the horizontal and vertical deflection producing means, and the synchronizing signal means of a television receiver and the means to produce the synchronizing signal records, on the tape; and also interconnections between the means for sensing the synchronizing signal records previously recorded on the tape, with the horizontal and vertical deflection producing means of the television receiver, are disclosed and shown in FIGURES 79, 80, 83 and 84 of Letters Patent of the United States, No. 2,976,354, issued Mar. 21, 1961, on the application of myself and Emil L. Ranseen, Ser. No. 427,428, filed May 4, 1954, and issued entire interest to me; and in FIGURES 18, 19, 22 and 23 of application, Ser. No. 94,651, filed Mar. 9, 1961, by me and Agnes J. Ranseen, as executrix of the estate of Emil L. Ranseen, deceased, and issued Jan. 5, 1965, as Letters Patent No. 3,164,685 entire interest to me; and in FIGURES 1-A, 1-B, 19 and 20, of application, Ser. No. 419,612, filed Dec. 18, 1964 by me and Agnes J. Ranseen, as executrix of the estate of Emil L. Ranseen, deceased, and assigned, entire interest to me.

In FIGURE 1 I have shown the two wide band tapes, 48 for the color recording, and 49 for the monochrome recording of the program. These tapes carry cross-scans (instead of linear scans) for the video components of the two programs or renditions, such cross-scans not being shown in the figure to avoid confusion of the showings. In the particular embodiment illustrated, I have also made provision for producing the audio components of the two renditions by cross-scans, also not shown. Such arrangements are also fully disclosed in the earlier patents hereinbefore identified, as well as other pending applications by me. The tapes shown in FIGURE 1 are also provided with edge perforations 50 by which the tapes are driven. This will be hereinafter referred to. Also, the regularly spaced synchronizing signal recordings 51 are shown on these tapes 48 and 49, and such recordings are also extensively shown in my identified earlier cases. I have also, in FIGURE 1 (and also in FIGURE 3) shown the recorder deflectable beam units of generally triangular form, 52 and 53 in FIGURE 1, left-hand element, and 54 and 55 in such figure, right-hand element. There the elements 52 and 54 are designated as "Video," and the elements 53 and 55 as "Audio." These units are deflectable beam electron beam scanning units constituted for delivering scanning force effects to the outside of the units, for sensing previously produced cross-scan recordings carried by the respective tapes, and to produce signals of varying strength according to the variations of the strengths of the cross-scans so sensed. It is also here noted that in my earlier and identified cases I have disclosed scannings and recordings of audio frequency signals, superimposed on video signal cross-scan radio frequency signals, selective sensing scanning of both sets of such signals being possible due to the great disparity between the video signals and the audio signals. Accordingly, I have shown both sets of sensing elements in operative positions with respect to the tapes being sensed. I have also shown the sensing plates or elements 56, 57, 58 and 59 close to the right-hand edges of the elements 52, 53, 54 and 55, respectively, which sensing plates deliver variations of potential corresponding to the variations of the strengths of the magnetized (or static electrified) areas above or adjacent to them; and I have also shown the lines $24^a$ and $25^a$ connecting such sensing plates 56 and 58, for the video sensings, to the corresponding "Color" and "Monochrome" blocks, for delivering the sensed video signals to such blocks; and I have also shown the lines $28^a$ and $29^a$ connecting the sensing plates 57 and 59 connecting such sensing plates for the audio recordings, to the corresponding blocks which lead to the output lines $32^a$ and $33^a$, being mixing units for conventional functions.

During the sensing operations, the electron beams of the several deflectable beam units are held constant, so that the effects produced by the sensing of the plates 56, 57, 58 and 59 are imposed on such steady beams, and from such beams transferred to further processing operations. Accordingly, in FIGURE 1 I have shown a line 60 connected to the electron beam controls for the units 52 and 53, and another line 61 connected to the electron beam controls for the units 54 and 55. These lines 60 and 61 may be connected to other elements of the recorder, the details of which need not be described here, as they are disclosed in one or more of my earlier issued patents, and pending cases.

I have also in FIGURE 1 shown a line 62 connected to the horizontal (and vertical) deflecting unit 63, generally in the form of a saw-tooth generator or generators, for delivering the needed signals to the yokes of the several deflectable beam units, for producing the horizontal deflections of substantially 15,750 c.p.s., according to F.C.C. rulings.

I have also in FIGURE 1 shown the synchronizing signal sensing units 64 and 65 in position to be influenced by the successively passing records 51, for delivering the pulses which correspond to the arrival of the successive synchronizing signal records carried by the tape. In FIGURE 1 these units 64 and 65 are shown as connected to the adjacent blocks 66 and 67, to thus inject such synchronizing pulses into the stream of signals being emitted, and to be received and translated by the tuned receiver.

Since the showing of FIGURE 1 includes the two tapes 48 and 49, it is necessary to provide two tape controls therefor, or some form of drive for both of the tapes, from a common drive unit. In some cases it will be found desirable to locate the two sets of recordings for the two programs, on a single tape of sufficient width to accommodate both of such program recordings side by side, along the tape. Such an arrangement is shown in FIGURE 10, where the band areas for the two program renditions are legended as "Monochrome Program," 68, and "Color Program," 69, respectively. The sensing units 70 and 71, legended "Video," and the sensing units 72 and 73, legended "Audio," are provided for the two band areas, the units 70 and 72 serving the "Monochrome Program" area, and the units 71 and 73 serving the "Color Program" areas. In the present case, the single horizontal deflection line 74 serves all four of such sensing units, to thereby retain them in full synchronism of their scanning deflections; and, when sensing is being produced, the single potential line 75 serves the electron beam controls for all four of the sensing operational units.

Since this embodiment of FIGURE 10 requires but a single tape, I have shown only the single drive shaft 76 serving sprockets engaging openings 77 at both edge portions of the tape. Correspondingly, only a single tape drive control is needed with this arrangement.

Reference is next made to the tape drive controlling and synchronizing and phasing means provided for use in connection with the drive of the several embodiments already described, and also usable in connection with control of drives for other embodiments presenting similar problems of synchronization, speed, and phasing, for solution. FIGURE 3 shows, schematically, a simple embodiment of the drive control elements, acting to control a cross-scan tape drive, to produce proper synchronization and phase condition with respect to horizontal deflection producing means whether such deflecting means constitutes a portion of the tape drive and control elements themselves, or constitutes a portion of another unit, such as the conventional kinescope which embodies a horizontal deflection producing means for its beam deflections.

In the present case the tape carrying the cross-scans is identified as 78. It is driven by the two sprockets 79 and 80, engaging the sprocket holes 81 along both edge portions of the tape. Both sprockets are carried and driven by the common drive shaft 82. For simplicity of illustration I have shown only one of the deflectable beam units 83 in place above the top surface of the tape. The synchronizing records 51 are shown along one edge portion of the tape, and the corresponding sensor is located in position to sense and deliver a signal as each of such records arrives at the location of such sensor. Such sensor is identified as 35.

A constant speed motor 86 is provided for driving the shaft 82; but it is noted that the term "constant speed" is subject to a slight broadening in its meaning since even a conventional three phase synchronous motor is subject to slight variations in its speed according to variations in the frequency of the supplied current.

Conventional specifications fix the rate of horizontal deflections of the kinescope beam of the receiver at 15,750 per sec. When the tape speed is exactly 15¾ i.p.s., and the successive cross-scans are spaced on the tape at exactly 1 mil, such cross-scans will arrive at the locations of the sensor at the same rate as the rate of deflections of the kinescope beam. Then, if the deflection yoke of the recorder sensing unit is supplied with deflection signals from the horizontal deflection producing unit which supplies the deflection signals to the kinescope beam of the receiver, the beams of both such units (kinescope and sensor) will remain in step. Next, as long as the tape speed remains at exactly the rate to cause 15,750 of the recorded cross-scans to pass the sensing unit, per second, the deflections of the sensing unit will be produced at the same rate as the arrivals of the recorded cross-scans on the tape, at the location of such sensing unit. Proper sensing of each recorded cross-scan may then occur, to the extent that there will be produced a cross-scan of the sensor corresponding to each cross-scan record arriving at the sensor location.

Any change of tape speed, or of rate of horizontal deflections will result in non-synchronization of the sensing of the recorded cross-scans, with the horizontal deflections occurring in the receiver kinescope. Since the recorded cross-scans are very close together (of the order of one or two mils), and since such recorded cross-scans are arriving at the sensor location at the high rate mentioned above, it is evident that very slight variations in tape speed will throw the relationship defined in the foregoing paragraph out of balance. Accordingly, there must be provided means for controlling the tape speed for production of corrections thereof with great promptness when a lack of the synchronous condition outlined above occurs; and such corrections of tape speed must be made without appreciable delay since such errors are cumulative. I have provided means to effect very prompt correction of such errors with restoration of the synchronous condition explained above. Such corrections will continue, either as an increase of tape speed or as a decrease of such speed, and in the proper direction of change (either increase or decrease) of speed, until correction has been completed; or, if necessary, the corrective effect may continue indefinitely. Such a condition might exist if the frequency of the supplied current were to change over an appreciable interval of time. Reference is now made to FIGURE 3, as follows:

A differential transmission unit 87 is included between the output shaft 88 of the motor 86 and the sprocket shaft. Such differential unit includes the input or drive bevel gear 89, driven by the motor shaft 88, and the output or driven bevel gear 90 connected to the sprocket shaft. The cage unit 91 (see FIGURE 9) is included between the bevel gears. Such cage carries one or more (in the illustrated case, two) bevel pinions 92 and 93 journalled on a cross-wise extending rod 94 which extends across the cage. Both of such pinions mesh at all times with the two bevel gears. The perimeter of the cage includes the ring 95 having its outer surface provided with a worm gear 96. Such worm gear is engaged by the worm element 97, carried by the correction shaft 98, suitably journalled in stationary elements. The worm gear and the worm teeth constitute a drive from the shaft 98 to the cage, such drive being irreversible—that is, back drive from the cage to the shaft is prohibited by reason of the small pitch of such worm gear drive; but drive from the shaft to the cage is permitted.

It is evident that as long as the cage and the shaft 98 remain stationary, drive from the motor shaft to the sprocket shaft will occur at the same rate as the rate of the motor shaft, but in reverse direction from the motor shaft. Thus when no correction is to be made the correction shaft is allowed to remain stationary. When correction is to be made, such shaft 98 is rotated. Such rotation causes the cage to rotate in direction dependent on the direction of rotation of such shaft 98; and each complete rotation of the cage produces a double angular rotation of the bevel gear 90, and thus, two rotations of the sprocket shaft, provided that the motor shaft is stationary. If such motor shaft is rotating, such two rotations will be additive to the angular displacement of the worm gear 90 when the control shaft rotation is in one direction, but will be subtractive, when the control shaft rotation is in the opposite direction. Also, the rate of change of the speed of the output worm gear 90 will depend on the rate of rotation of the control shaft, and thus the amount of corrective effect produced by operation of such control shaft will depend on the duration of the correcting operation. It is also evident that when the correction is continuously required, as when the motor drive may be continuously slow due to some factor affecting the service supply lines, such continuous correction may occur as long as needed merely by continuing the rotation of the correction shaft.

Since the rate of correction effect depends on the disparity between the rate of sensing scans produced in the sensing unit 83 and the rate at which recorded cross-scans are arriving at the location of such sensing operation, I have provided means to constantly test and compare such rates, with production of a rotational effect proportional to the difference between such rates, and also to cause that rotational effect to be in direction to reduce the difference between such rates until zero disparity is attained. This operation may be further analyzed as follows:

The disparity to be corrected comprises a difference between two rates—the one rate being the rate of horizontal deflections produced in the sensing unit, and the other rate being the rate of arrival of the recorded cross-scans at the sensing location. When the rate of horizontal deflections remains constant, and when the rotational rate of the drive motor remains constant, such two rates being fixed for the time being, it is evident that the desired agreement between the rates of horizontal deflection and of arrival of recorded cross-scans at the sensing location, can only be attained by a continuous correctional operation at a rate determined by the value of any disparity between the rate of cross-scan arrival at the sensing location and the rate of horizontal deflections, existing prior to such correction operation. It thus remains to determine that disparity in rates, and to make provision for effecting correction in amount as thus determined. This correction amount is determined, and the needed correction is produced as follows:

I have provided two stepping motors 99 and 100, preferably located close together and co-axial as shown in FIGURES 3 and 4. Each of these motors includes a stator element including three field producing coils A, B and C in the motor 99, and A', B' and C' in the motor 100. These several coils are caged in magnetic cages which include teeth around their perimeters so that when the coil of one such cage is electrified, its teeth all become magnetized at the same density and polarity. Such cages and their teeth are carried by the housings of the motors, respectively. The teeth of a typical such cage are identified as 101 in FIGURES 5, 6 and 7. For convenience of identification and nomenclature, I shall refer to the motor 99 as the reference motor, and the motor 100 as the correction motor. The shaft 102 of the reference motor is journalled for rotation. This shaft extends through the correction motor and terminates at the right-hand end thereof (see FIGURE 4). For convenience of assembly such shaft is reduced in diameter where it passes through the correction motor; but during assembly a sleeve 103 is set onto such reduced diameter portion and secured in place so that such sleeve constitutes in effect a portion of the shaft. Each of the motors 99 and 100 is provided with three disk-like armature or rotor elements 104 secured to the shaft 102 (or to the sleeve 103), in position to register radially with the teeth of the corresponding stator cage. Each of these disk-like structures is provided in its periphery with teeth 105 equal in number to the teeth of the cage to which it corresponds. The disk-like armatures are so secured to the shaft (or to the sleeve 103) in rotated position or angularity such that when the rotor teeth of the disk of the motor section A (or A') register completely with the corresponding cage teeth, the rotor teeth of the other motor portions B and C (or B' and C') are angularly displaced by one-third of a tooth distance center to center (in the case of motor section B (or B'), or two-thirds of a tooth distance center to center (in the case of the motor section C (or C')). Accordingly, if the first pulse is delivered to the motor stator coil A (or A'), the rotor unit as a whole will be advanced to position of registry of the A teeth with corresponding stator teeth, as shown in FIGURE 5; and the rotor teeth of the sections B and C (or B' and C') will be brought into the positions shown in FIGURE 6 and 7. Then, when the next pulse arrives and is delivered to the coil B (or B'), the rotor as a whole will be advanced an angular amount equal to one-third of the angular distance between teeth (center to center); and when the third pulse arrives and is delivered to the coil C (or C'), the rotor as a whole will be advanced another third of such tooth-to-tooth angular distance, to restore the teeth of the section A (or A') to the position shown in FIGURE 5. Thus, by delivering successive pulses to the three coils of either of the motor units, with proper succession of such pulses to the three coils of the corresponding motor unit, rotation between the rotor and the stator of such motor unit will be produced.

It is further evident that such pulses thus delivered to the three coils of a motor unit may be thus delivered either according to the sequence A–B–C, or the sequence A–C–B. The direction of rotation will thus depend on which sequence of pulse delivery is used. It is also evident that the rate of rotation will, in any case be determined by the rate of pulse deliveries. It will also be evident that by the use of structures including a considerable number of teeth in each motor unit, the rate of rotation may be correspondingly lowered. For example, if the number of teeth in each motor section is thirty, and if the rate of pulse delivery is 180/sec., then the rate of rotation will be 2 per second, since the angular advance per pulse is one-third of a tooth. Further, if provision is made for delivery of one pulse corresponding to each recorded synchronizing signal (on the tape), and each such signal corresponds to one field of scanning (under F.C.C. specifications), then there will be delivered 60 such synchronizing signals per sec. And if each such synchronizing signal pulse be divided into three pulses, there will be delivered 180 of such divided pulses per sec., corresponding to 2/r.p.s. in the motor section, either 99 or 100, to which such pulses are delivered.

Next; the horizontal deflection control unit, whether comprising a portion of the television receiver, or a special saw-tooth generator unit comprising a portion of the recorder, will, or may be made to deliver 60 or some other standard number of pulses/sec., to produce the fields of deflection of the receiver. During the interval of each field the conventional 262 (or 263) horizontal deflections of the kinescope beam are being produced. This occurs between two successive bursts or signals which re-set the kinescope beam to its assigned starting position (e.g., the upper left-hand corner of the raster). Connections are established between the saw-tooth generator and the yoke of the cross-scanning unit of the recorder, to cause the beam of such unit to execute cross-scans in exact synchronism with the horizontal deflections of the receiver kinescope beam.

During the recording operation, previous to the sensing operation for re-play of the recorded program, scan records were successively established on the tape corresponding to the successive horizontal deflections of the kinescope beam. Connections are also established between the saw-tooth generator of the receiver (or other suitable unit), and the recorder for delivering the "burst" or synchronizing signals which define completion of each field of the recorded scans, to the synchronizing signal producing unit, for production of the synchronizing signal records on the tape (such records being shown at 51 in FIGURES 1, 3 and 10 of the case). Such synchronizing-signal record-producing connections are shown at 217 and 218 of FIGURE 79 of Patent No. 2,976,354, issued to me Mar. 21, 1961, and also in FIGURES 80, 83 and 84 of said patent; also, in Patent No. 3,164,665, issued to me Jan. 5, 1965, as a division of said patent, No. 2,976,354; and also in my co-pending application, Ser. No. 419,612, filed Dec. 18, 1964, now U.S. Patent No. 3,351,718, as a division of said Patent No. 3,164,665. Accordingly, between successive ones of the synchronizing signal records 51 there have been produced on the tape, a number of cross-scan-recordings corresponding to the number of horizontal deflections produced in the kinescope of the receiver; and each such so-recorded cross-scan record varies in intensity corresponding to the variations of intensity of the electron beam of the receiver kinescope which occurred during the recording operation. It also follows that in order to exactly sense and translate the so-recorded program element, each of the synchronizing signal records 51, on the tape, should arrive at the sensing position at the same instant as the corresponding "burst" or synchronizing signal is produced by the synchronizing signal producing element of the receiver, the element 64, or 65, or $66^b$ now being disconnected from the synchronizing signal producing element of the receiver. It also follows that there must be, recorded on the tape between two successive synchronizing signal records 51, a number of cross-scan records equal to the number of horizontal deflections produced in the receiver kinescope by the saw-tooth generator, during the interval between the "bursts" which corresponded to the production of the record. That condition of equality necessarily exists since the recordings, both of the cross-scans and of the synchronizing signal records, were produced at the same time, and by the same basic signal producing elements. That equality will also exist, even if there occur variations in the rate of the horizontal deflections, or the rate of the tape travel, during the recording interval.

On the other hand, during playing-back (sensing of the recorded cross-scans, and sensing of the recorded synchronizing signals), the rate of arrival of the cross-scans records at the sensing unit location, and the rate of arrival of the synchronizing signal records, at the synchronizing signal sensing means ($66^b$ of FIGURE 3), both depend on the tape speed. That tape speed must therefore be at all times correct (or corrected) to a value to pass the same number of cross-scans through the sensing zone as the number of horizontal deflections occurring in the kinescope beam, at the time in question. This is true since the rate of the horizontal deflections of the kinescope beam is independent of the rate of passage of the previously recorded cross-scans through the cross-scan sensing zone of the recorder.

I have provided means to determine the rate of the horizontal deflections of the kinescope, and means to determine the rate of the recorded cross-scans on the tape, passing a reference point (e.g., the location of the synchronizing signal records sensing element); and means to compare these two rates. Such comparison means I herein designate as the "Comparator," for purposes of identification. Such comparator determines the differences in the two rates, if any, and also, which rate is the greater, and by what amount. The comparator makes such disparity of rate determination continuously, and gives a continuous indication including identification of which rate is dominant. The comparator then causes a rate correction unit to produce correction of the tape speed by an amount, and in direction (either increase or decrease) to restore the disparity to zero, by making correction of tape speed. Such correction may continue for an indefinite length of time, and always at rate to balance the disparity being corrected or neutralized.

It is noted that the rate of correction means herein disclosed includes production of a "correction rate," equal to the disparity between the rates being compared; and includes means to effect correction of one of the rates by amount correct to bring the rates into equality. In the specific embodiment shown in figure such correction is produced by causing the tape drive rate to be corrected in proper amount. This is done by superimposing the correction rate on the rate of drive from the drive motor to the tape sprockets, so that such tape sprockets will be driven at rate to cause the tape to travel at the needed rate for synchronous operation, already detailed. Such correction rate will be large or small, as needed; but in most cases it will be continuous—sometimes increasing slightly, and afterwards decreasing, always in degree of change of the correction rate according to the determined and indicated rate of the disparity, determined by the comparator.

Referring again to FIGURE 3, the motor section 99 has its stator coils connected to the synchronizing signal sensor $66^b$ for activation by the pulses delivered from such sensor; and the motor section 100 has its stator coils connected to the element which produces the signals to re-set the electron beam to its starting corner for commencement of each field of the raster production. In the showing of FIGURE 3 I have indicated the "Horizontal Deflector" unit 113, whose rate of delivery of the deflection signals may be adjusted by use of the element $113^a$. Such unit 113 is connected to the count down unit 122. These units may also produce the pulses to produce the re-settings of the kinescope beam to its starting position. Such units are well known in the arts. The beam re-setting pulses serve to activate the stepping motor element 100, at a rate proportional to the rate of commencement of the fields of the kinescope production; the pulses delivered to the stepping motor 99 have a rate proportional to the rate at which the synchronizing signals records are arriving at the location of the sensor $66^b$. If it be assumed that the rate delivered to the motor section 99 is 60 c.p.s., and that the rate delivered to the motor section 100 is 61 c.p.s., by way of example, then it is evident that the tape speed is too slow for production of equality of the rate of arrival of the cross-scans at the sensing position, as compared to the rate of production of the horizontal deflections of the kinescope beam and in the sensor 83 (in FIGURE 3); so that an imperfect translation of the recorded signals will occur. It thus becomes needful to cause the "correction motor" 100 to produce correction of the rate of tape travel in amount just sufficient to deliver a correction rate to the drive of the tape, to produce the desired synchronism.

Study of the operations taking place within the double stepping motor unit 99–100, under the condition that one of the motor sections 99 and 100 is supplied with pulses at a faster rate than the other, where the rotors of the two sections are drivingly connected together (as in the showing of FIGURES 4, 5, 6 and 7), and where the stator of one section is anchored against rotation, while the stator of the other section is journalled for free rotation according to the electro-magnetic functions produced in the stators by such different rate pulses, shows the following:

Assuming that the pulses are delivered to both stators according to the same sequence of coil electrification, as A–B–C, and that the rate of pulses to stator 99 is 60 c.p.s., and the rate to stator 100 is 61 c.p.s., as suggested in the preceding paragraph; also that each stator has 30 poles, and three stator sections, A, B and C, as shown in the figures. Also, that each of the main pulses is subdivided into three sub-pulses, as previously mentioned herein; in such case the rotor sections which are both secured to the same shaft, will rotate in the direction dictated by the sequence A–B–C in the stator of motor unit 99, being counterclockwise as shown in FIGURES 5, 6 and 7, which are sections taken on the lines 5—5, 6—6 and 7—7 of FIGURE 4, looking leftwardly. It is assumed above, that the stator of motor section 99 is anchored against rotation. At the same time that the rotor is thus rotating counterclockwise at 2 r.p.s., as already analyzed herein, the coils A', B' and C' of the stator of motor section 100 are being pulsed by main pulses at the rate of 61 c.p.s., instead of 60 c.p.s., as in the case of the stator of motor section 99. Thus, there will be produced a reaction between the rotor unit and the stator of motor section 100, producing a torque to cause rotation of the stator of motor unit 100, clockwise at the rate of $\frac{1}{60}$ of the rotor rate, namely $\frac{2}{60}$ r.p.s., or $\frac{1}{30}$ r.p.s. Since the stator of motor section 100 is journalled onto the shaft 102 (which is journalled into the stator of motor section 99), such stator section of motor 100 will rotate clockwise at such slow rate as indicated above, indefinitely, as long as the disparity between the two sets of pulse rates, exists. Thus the comparator unit legended "Rate Comparator" in FIGURE 3 compares the rates of the synchronizing pulses as produced by the tape speed, and the field defining pulses produced for re-setting of the horizontal scans of the kinescope to the starting position, and produces a rotational speed proportional to the difference between such two speeds and in direction of rotation dictated by the dominant speed.

Referring again to FIGURE 3, the output shaft 107 of the motor unit section 100 (see also FIGURE 4), drives the cage 87 of the differential unit which includes the input and output bevel gears 89 and 90, respectively, such cage including the two pinions 92 and 93 engaging both of the bevel gears accordingly, as long as the cage remains stationary the output bevel gear 90 will rotate at the same speed as the input bevel gear, but in direction opposite thereto. By rotation of the cage in one direction or the other the rotation of the output bevel gear will be either advanced or retarded compared to the rotation of the input bevel gear then occurring; and each full rotation of such cage will produce a rotational advance or retardation of the output bevel gear double the angular movement of the cage—that is, two rotations of the output bevel gear.

The output shaft 107 of the comparator unit is connected to the cage drive shaft of the differential unit 87 by a worm and ring gear drive connection 96–97 (shown in FIGURE 9), such connection to the cage drive shaft 98 including another correction unit, if desired, presently to be described. Thus it appears that as long as correction of the speed of the tape drive is required to effect the desired synchronization of the speeds of arrival of the cross-scans at the sensing unit location, and of the horizontal deflections of the kinescope, such correction will be effected by the comparator unit, acting through the differential unit 87, either as a temporary correction, or as a continuous correction, at the rate of correction demanded, and in the direction needed to produce exact synchronization. It is reminded that these operations are not produced by control of the motor speed 86; and that, in fact such corrections may and will be made from time to time to correct also for variations in the speed of that motor itself, as well as for variations of the rate of the horizontal deflections produced in the kinescope beam by operational changes in the saw-tooth generator, or otherwise. These corrections may be summarized as corrections in the rate of tape travel needed from time to time or continuously, to cause the rate of arrival of the recorded cross-scans on the tape, at the location of the sensing unit, to be the same as the rate of production of the horizontal deflections of the kinescope beam. Under this definition the following further explanation is proper:

Each synchronizing signal pulse is produced by arrival of a previously recorded synchronizing signal record, at the location of the synchronizing signal sensing element 66$^b$; the signal announcing termination of each field of horizontal deflections of the kinescope, and commencement of the next field of such deflections may be the burst by which the kinescope beam is re-set to its starting position. In FIGURE 3 I have shown the unit 113 legended "Horizontal Deflections," and the unit 122 next thereto, and legended "Count Down." In the description so far made, I have referred to such burst as providing the pulse delivered to the motor section 100, such bursts occurring at the rate of substantially 60/sec., under present F.C.C. specifications. In FIGURE 3 I have shown such "Count Down" unit as being connected to the unit 124, being a "Pulse Splitter," and I have also shown the synchronizing signal sensing unit 66$^b$ as connected to a unit 125, also legended "Pulse Splitter." These pulse splitters may be of the form shown in FIGURE 8, presently to be described. At this time it is noted that the function of each of these units is to split a received pulse into three sub-pulses, timed apart by intervals of substantially one-third the total interval between two successively arriving pulses. Thus, when the arriving pulses arrive at the rate of 60/sec., the sub-pulses will be delivered at the rate of 180/sec. Such rate (180/sec.) is a convenient rate for successful operation of various forms of stepping motors, of the general type already referred to herein. Two embodiments of such small stepping motors are shown in the application of Lytle, Suhrke, and Bradley, Ser. No. 37,508, filed June 20, 1960, now U.S. Patent No. 3,056,137 for Improvements in Motor Drives for Control Rods for Reactors, and the Like, assigned entire interest to me, FIGURES 12–13 and 14, and FIGURES 15–16 and 17, of said application as filed. Other forms of such stepping motors are also shown in Letters Patent of the United States, No. 3,005,118, issued Oct. 17, 1961, on the application of Emil L. Ranseen, and issued to Agnes J. Ranseen. Such examples of stepping motors are here stated by way of example and not by way of limitation, except as I may limit myself in the claims to follow.

Reference to FIGURE 8 shows a simple form of circuitry for producing three output pulses from each input pulse, a function already referred to. In this circuitry the following operations occur:

The three astable circuits $A_1B_1$, $A_2B_2$ and $A_3B_3$ are connected in series. By astable circuit is meant a circuit that has a normal stable condition which can be triggered into another condition, remain in the second condition for a definite period of time, at the end of which it, by itself and without further external signal, goes through a transition back into the normal stable state, remaining in that normal stable state until another triggering signal is again received. Referring to FIGURE 8, in the normal state $A_1$, $A_2$ and $A_3$ are conducting, and $B_1$, $B_2$ and $B_3$ are cut-off. Application of a signal to $A_1$ will turn $A_1$ off, and $B_1$ on. This condition will hold for a definite period of time, normally determined by the discharge of a capacitor between two voltages, at the end of which a transition takes place to the original condition with $A_1$ on, and $B_1$ off. While $B_1$ is "On" the motor coil A (FIGURE 4) is energized.

The change in voltage at $B_1$ when $B_1$ goes off is used to cut-off $A_2$ and turn $B_2$ on. Again, at the end of the period $A_2$ comes on, $B_2$ goes off, and the resulting signal cuts on $A_3$. At the end of a third period $A_3B_3$ goes back to its normal condition. As a result, a single pulse applied at $A_1$ has caused coils A, B and C to be energized for definite periods of itme.

In order to produce slight delays in the successive functioning of the elements and to ensure that the pulses delivered to the three coils of a motor do not occur almost simultaneously, I have shown the delay elements 108 and 109 between the elements $B_1$ and $A_2$, and between the elements $B_2$ and $A_3$. In this connection it is noted that when the arriving pulses arrive at the rate of 60 c.p.s., the successive divided pulses are separated by time intervals of slightly less than 1/180 sec.

It is also noted that when such rate of the coil energizing pulses is used (180/sec.), the rotations of the rotor are substantially continuous, but under the pulse activations. Therefore the shaft 102 and the rotor elements of both motor sections, will rotate substantially continuously, at the rate of 2 r.p.s., assuming that the signals (primary) are received at the rate of 60/c.p.s., produced by a tape speed of substantially 15¾ i.p.s. The rotational speed of the stator of motor element 100 will almost always be low, since that speed is determined by the difference between the two pulse rates; and such difference would, in all probability be very small, but in any case, enough to produce serious interference with the perfection of translation of the picture.

Since the corrective drive originates as a slow rotation of the shaft 107, delivered to the differential cage 91 through a worm and worm gear drive (shown in FIGURE 9), it is seen that each corrective pulse delivered to the double motor unit, will produce a very small driving effect when the tape is reached, and that thus the corrective effect will become one of great accuracy when imposed on the drive rate being originally delivered by the drive motor 86. Accordingly, the disparity between the rates of delivery of the sensed synchronizing signals from the tape, and the bursts corresponding to commencement of the fields of horizontal deflection of the kinescope beam, may be completely eliminated; and the parity of such rates may be substantially maintained at all times.

As already pointed out, the equality of such two rates must be accompanied by "phasing" the operations, so that the first horizontal deflection of each field of such deflections produced by the kinescope beam, will be produced concurrently with the sensing of the first cross-scan of a field of the recorded cross-scans on the tape. The means whereby this "phasing" operation is produced is as follows:

I have provided a small differential unit 110 between the output shaft 107 of the double stepping motor unit, and the shaft 98 which drives the worm of the differential unit 87 (FIGURE 3), already explained. The worm of such small differential unit 110 is driven by the shaft 111, which is under drive of the small D.C. motor 112. It is evident that as long as the motor 112 remains un-electrified the worm of such small differential unit will remain stationary. Under this condition, drive from the double stepping motor comparator unit to the differential unit 87 will produce correction of tape rate at that value required to produce parity between the rates of arrival of the recorded synchronizing signals on the tape at the corresponding sensing unit $66^b$, and the commencement of the successive fields of horizontal deflections of the kinescope beam. Still, the fields of recorded cross-scans and of horizontal kinescope deflections must be brought into phase. This is done as follows:

I have provided the phasing comparator unit 114 (see FIGURE 3). This includes the two magnetizing coils 115 and 116 acting on the common armature 117. The coil 115 is connected to the lines 120 which deliver pulses from the synchronizing signal sensing unit $66^b$; the coil 116 is connected to the lines 121 which deliver pulses from the horizontal deflection count down unit 122, corresponding to commencement of the successive fields of kinescope scan. The two coils 115 and 116, and the connections to them, are such that when both coils are energized simultaneously the coils neutralize their magnetomotive forces, thus producing no pull on the armature. On the other hand when the pulses delivered to the two coils are out of phase, each coil will exert a pulling action on the armature; and due to the fact that such pulses are at the rate of substantially 60/sec., each, the armature is, under such conditions, effectively drawn leftward. When the pulses are in exact phase such pull no longer is produced and the armature remains in its rightward, illustrated position. The small D.C. motor 112 is served with D.C. over the lines 126, which include the switch element 119, normally open, being the condition assumed when the condition of exact phasing occurs, since at such time the coils neutralize each other. At other times the switch is closed, thus producing drive of the motor 112, to effect a phasing correction by the small differential unit 110, and thus imposing a phase correction of speed correction, imposed on the drive from the motor to the tape. Such phasing correction will continue until exact phasing occurs, whereupon the rate of tape drive correction produced by the double motor unit will continue, thus ensuring parity between the rates of the sensings of cross-scans and production of horizontal deflections of the kinescope beam; together with exact phasing of the commencement of each field of recorded cross-scans, with the corresponding field of horizontal kinescope beam deflections.

I claim:

1. In a wide band, cross-scan tape recorder; the combination of a laterally deflectable beam unit disposed in position with respect to a tape having a record receiving surface, said deflectable beam unit being constituted to produce cross-scan records on said surface, wherein the recorded strength of each cross-scan record varies along such cross-scan in proportion to the variation of the beam strength during the cross-scanning operation; means to advance the tape including a tape engaging element, a power-drive unit operating at substantially uniform rate, in driving connection with the tape engaging element; means to deliver lateral beam deflection producing signals to the deflectable beam unit for production of cross-scanning operations by said beam, including means to produce a first defined synchronizing signal corresponding to conclusion of each group of a pre-determined number of consecutive cross-scans producing signals, means to produce a synchronizing signal record on the tape corresponding to each such synchronizing signal; and connections between such first defined signal producing means, and the synchronizing signal recording means, constituted to produce a synchronizing signal record corresponding to completion of each group of cross-scans of such predetermined number.

2. A tape recorder structure as defined in claim 1; wherein the deflectable beam unit comprises an election beam unit, including a lateral beam deflection producing element comprising a deflection producing yoke; and wherein the means to produce the lateral beam deflection producing signals comprises a saw-tooth generator, together with connections from such saw-tooth generator to the lateral beam deflection producing yoke.

3. A structure as defined in claim 1; wherein the synchronizing signal record producing means also includes synchronizing signal record sensing means; together with means during playing back, to sense the arrival of the synchronizing records at the location of said synchronizing signal records sensing means, with production of a corresponding second defined synchronizing signal; and means, during playing-back to synchronize the rate of arrival of the synchronizing signal records at the location of the synchronizing signal record sensing means, with the rate of production of the first defined synchronizing signals by the lateral deflection signal producing means; comprising rate of tape advance control means between the power drive means and the tape engaging element, constituted to control the rate of advance of the tape advance means; means to compare the rate of arrival of the second defined sensed synchronizing signal records at the location of the synchronizing signal records sensing means, with the rate of production of the first defined synchronizing signals, including means to determine the algebraic difference between said rates; and movable means in connection with said algebraic difference determining means, and in connection with the rate of tape advance control means which is between the power drive means and the tape engaging element, constituted to actuate said means which is between the power drive means and the tape engaging element, to produce correction of the rate of operation of said tape advancing element, in direction of correction to reduce said algebraic difference between the two rates.

4. A structure as defined in claim 3; wherein the means which controls the rate of the tape advance element, comprises a differential determining unit including a first rotary force producing unit, a second rotary force producing unit, and an intermediate rotary force receiving unit in position for rotation with respect to said first and second rotary force producing units, the first and second rotary force producing units producing rotary forces on such intermediate rotary force receiving unit, at rates proportionate to the rates of the corresponding synchronizing signals delivered to the first and the second rotary force producing units; wherein the second rotary force producing unit is mounted for bodily rotary movement about its axis; together with connections between the second defined synchronizing signal records sensing means, and the first defined rotary force producing unit constituted to cause the rate of rotary force produced by said unit to be proportional to the rate of such second defined synchronizing signals, and connections between the first defined synchronizing signal producing means, and the second rotary force producing means constituted to cause the rate of rotary force produced by said unit to be proportional to the rate of the first defined synchronizing signals; whereby the intermediate rotary force receiving unit is rotated at speed and in direction corresponding to the algebraic difference between the second and the first defined synchronizing signal rates; together with connections between the second rotary force producing unit and the rate of tape advance means which is between the power drive unit and the tape advance element, constituted to modify the rate of the tape advance element by amount proportional to the difference between the first and the second defined synchronizing signal rates, and constituted to modify the rate of the tape advance element in algebraic direction to reduce the differential between the first defined and the second defined rates.

5. The structure as defined in claim 4; wherein the differential determining unit comprises a pair of stepping motors, each including a stator and a rotor, wherein the numbers of teeth of the rotor and the stator of each stepping motor are equal to each other; and wherein the number of teeth of such elements of both stepping motors are equal to each other; whereby each synchronizing signal delivered to either of such stepping motors produces angular advance of the rotary force produced by such signal, equal to the angular advance of a synchronizing signal delivered to the other stepping motor.

6. A structure as defined in claim 5; wherein the rotors of both stepping motors are in axial alignment and are both connected together for rotation as a unit.

7. A structure as defined in claim 6; wherein the stator of one of the stepping motors is retained against rotary movement, and wherein the stator of the other stepping motor is journalled for rotation on its rotor axis of rotation; and wherein the connections between the second rotary force producing unit and the rate of tape advance means which is between the power drive unit and the tape advance element, comprise connections between the journalled stator of such other stepping motor, and the tape advance element.

8. A structure as defined in claim 7; wherein the connections which are between the second rotary force producing unit and the rate of tape advance means which is between the power drive unit and the tape advance element, comprise a differential unit including companion oppositely facing ring gears, and an intermediate cage element carrying pinions engaging both such ring gears; together with a drive connection from the power drive unit to one of the ring gears, and a driven connection between the other ring gear and the tape advance element; together with a drive connection between the journalled stator and the cage element of the differential unit.

9. A structure as defined in claim 3; wherein the recorded cross-scans comprise successive groups of cross-scans, each group when sensed and translated producing an intelligible integer of recorded information; together with phasing means constituted to cause each first defined synchronizing signal and a corresponding second defined synchronizing signal, to occur simultaneously, corresponding to commencement of sensing a group of the recorded cross-scans simultaneously with commencement of production of a group of the lateral beam deflection producing signals.

10. A structure as defined in claim 9; wherein the phasing means comprises a second drive means in connection with the movable means which is in connection with the algebraic difference determining means, said second drive means being constituted to change the rate of said movable means; and means in connection with said second drive means to discontinue said second drive means rate changing; together with means in connection with said discontinuing means, and in connection with the first defined synchronizing signals producing means, and in connection with the second defined synchronizing signals producing means, effective to make operative said discontinuing means when the first defined and the second defined synchronizing signals occur simultaneously.

11. A structure as defined in claim 7; wherein the recorded cross-scans comprise successive groups of cross-scans, each group when sensed and translated producing an intelligible integer of recorded information; together with phasing means constituted to cause each first defined synchronizing signal and a corresponding second defined synchronizing signal, to occur simultaneously, corresponding to commencement of sensing a group of the recorded cross-scans simultaneously with commencement of production of a group of the lateral beam deflection producing signals; wherein the phasing means comprises a second drive means in connection with the connections which are between the journalled stator, and the tape advance element; said second drive means including a differential unit included in said connections between the journalled stator and the tape advance element, wherein such differential unit includes a first ring gear in driving connection with the journalled stator, a second ring gear in connection with the tape advance element, a cage element in gear connection with both such ring gears, and a second drive motor in driving connection with the cage element; means in connection with said second drive motor for supply of current to such motor; together with means constituted to discontinue supply of current to such motor when the first defined synchronizing signal and the second defined synchronizing signal occur simultaneously.

12. A structure as defined in claim 11; wherein the second ring gear of the differential unit of which the cage is driven by said second drive motor, is in driving connection with the cage of the first differential unit of which the ring gear is driven by the power drive unit.

13. A structure comprising means to sense and deliver signals corresponding to a tape recording of cross-scans of varying strength, translatable to produce an intelligible translation of the information corresponding to such cross-scan recordings; wherein the cross-scans comprise groups of substantially equal number of cross-scans in the successive groups, and wherein each such group of cross-scans, when sensed and translated, produces an integer of intelligible information; and wherein the tape recording includes synchronizing signal records defining completion of the sensing of each such group and commencement of the sensing of the succeeding group; the combination of means to advance the tape at substantially uniform rate, including a substantially constant speed tape drive motor, and driving connections from said motor to a tape drive element; cross-scan sensing means; means to produce and emit and deliver cross-scan producing signals to the cross-scan sensing means, and to emit a first defined synchronizing signal defining completion of emitting such cross-scan producing signals corresponding to each such group of cross-scans sensed; means to sense arrival of each of the synchronizing signal records at the location of the sensing means and to emit a second defined synchronizing signal correspoding to such synchronizing signal record; means to compare the times of emission of the first defined synchronizing signal and of the second defined synchronizing signal; means to deliver the first defined synchronizing signals and the second defined synchronizing signals, to said time of arrival comparing means; the driving connections from the tape drive motor to the tape advancing element including tape drive rate correction means constituted to modify the rate of tape drive; and operative connections between the time of arrival comparing means, and the tape drive rate correction means, including means constituted to make said correction means inoperative with corresponding discontinuance of the tape drive correction means operation, when both the first defined synchronizing signal, and the second defined synchronizing signal arrive simultaneously at the time of arrival comparing means.

14. A structure as defined in claim 13; wherein each group of the recorded cross-scans when sensed and translated, corresponds to a raster of a television video translation; and wherein each of the synchronizing signal tape recordings when sensed and translated corresponds to the re-setting of the kinescope beam control, for commencement of production of a raster on the viewing screen of the television receiver.

15. A structure as defined in claim 14; wherein the cross-scan recordings correspond to lateral deflections of a video signal translation unit of a television receiver.

16. A structure as defined in claim 14; wherein the cross-scan recordings correspond to recordings of audio frequency signals.

17. Means to sense and produce signal from such sensing of recorded cross-scans carried by a tape; comprising in combination, cross-scanning means in proximity to the tape recorded surface, means to advance the tape past the cross-scanning means, including means to vary the rate of advance of the tape, being a first defined rate varying means; means to cause production of the cross-scanning operations including means to vary the rate of production of the cross-scanning operations, being a second defined rate varying means; means to determine and give an indication of the rate of production of the cross-scanning operation; means to determine and give an indication of the rate of arrival of the recorded cross-scans at a position fixed with reference to the location of the cross-scanning means; and means to synchronize the two rates; said synchronizing means including a rate comparing unit constituted to compare the two rates and give an indication of algebraic disparity between the two rates, including the algebraic direction of such disparity; connections between the means which indicates the rate of production of the cross-scanning operations, and the rate comparing unit; and connections between the means which determines and gives an indication of the rate of arrival of the cross-scanned recordings at said fixed position, and the rate comparing unit; together with connections between said algebraic disparity indicating means and one of said rate varying means constituted to cause such rate varying means to vary the rate of the corresponding function, in algebraic direction to reduce the disparity between the two rates.

18. A structure as defined in claim 17; wherein the rate varying means to which the disparity indicating means is connected, is the tape speed rate producing means.

19. A structure as defined in claim 17; wherein the rate varying means to which the disparity indicating means is connected, is the means to vary the rate of production of the cross-scanning operations.

References Cited

UNITED STATES PATENTS

| | | | |
|---|---|---|---|
| 3,016,428 | 1/1962 | Kabell | 178—6.6 |
| 3,175,035 | 3/1965 | MacDonald | 178—6.6 |

ROBERT L. GRIFFIN, *Primary Examiner.*

H. W. BRITTON, *Assistant Examiner.*